(12) United States Patent
Wang et al.

(10) Patent No.: US 9,560,642 B2
(45) Date of Patent: Jan. 31, 2017

(54) METHOD AND APPARATUS FOR DETERMINING UPLINK CONTROL CHANNEL RESOURCES

(71) Applicant: FUJITSU LIMITED, Kawasaki-shi, Kanagawa (JP)

(72) Inventors: Yi Wang, Beijing (CN); Yueqiao Xu, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/973,833

(22) Filed: Dec. 18, 2015

(65) Prior Publication Data

US 2016/0105885 A1  Apr. 14, 2016

Related U.S. Application Data

(63) Continuation of application No. 14/566,162, filed on Dec. 10, 2014, which is a continuation of application No. PCT/CN2012/076887, filed on Jun. 14, 2012.

(51) Int. Cl.
*H04W 72/02* (2009.01)
*H04W 72/04* (2009.01)
(Continued)

(52) U.S. Cl.
CPC ........ *H04W 72/0413* (2013.01); *H04L 5/0048* (2013.01); *H04L 5/0053* (2013.01);
(Continued)

(58) Field of Classification Search
None
See application file for complete search history.

(56) References Cited

U.S. PATENT DOCUMENTS 9,072,086 B2   6/2015  Papasakellariou et al.
9,265,017 B2 * 2/2016  Sorrentino ............ H04W 52/54
(Continued)

FOREIGN PATENT DOCUMENTS

CN   101489255 A   7/2009
CN   102355325 A   2/2012
(Continued)

OTHER PUBLICATIONS

3GPP TS 36 213 V10.5.0; 3rd Generation Partnership Project; Technical Specification Group Radio Access Network; Evolved Universal Terrestrial Radio Access (E-UTRA); Physical layer procedures (Release 10) Mar. 2012.
(Continued)

*Primary Examiner* — Hassan Kizou
*Assistant Examiner* — Hashim Bhatti
(74) *Attorney, Agent, or Firm* — Myers Wolin, LLC

(57) ABSTRACT

User equipment (UE), includes: a receiver configured to receive a specific parameter configured for a mapping manner of an enhanced physical downlink control channel (E-PDCCH) of the UE by an eNB, wherein the specific parameter configured for the mapping manner of the E-PDCCH corresponds to a localized mapping or a distributed mapping; and a processing circuit coupled to a memory configured to determine uplink control channel (PUCCH) resources of the UE according to the specific parameter corresponding to the localized or distributed mapping of the E-PDCCH of the UE and a PUCCH calculation formula.

11 Claims, 10 Drawing Sheets

301 receiving, by user equipment (UE), a specific parameter configured for a mapping manner of its enhanced physical downlink control channel (E-PDCCH) by an eNB

302 determining its uplink control channel (PUCCH) resources by the UE according to the specific parameter corresponding to the mapping manner of its E-PDCCH and a PUCCH calculation formula

(51) Int. Cl.
*H04L 5/00* (2006.01)
*H04W 28/18* (2009.01)

(52) U.S. Cl.
CPC ......... *H04W 72/02* (2013.01); *H04W 72/042* (2013.01); *H04W 28/18* (2013.01)

(56) References Cited

U.S. PATENT DOCUMENTS

| | | | |
|---|---|---|---|
| 2011/0002293 A1 | 1/2011 | Yuk et al. | |
| 2011/0045860 A1 | 2/2011 | Nam et al. | |
| 2013/0039284 A1 | 2/2013 | Marinier et al. | |
| 2013/0121304 A1 | 5/2013 | Nory et al. | |
| 2013/0188566 A1* | 7/2013 | Zhu | H04W 72/042 370/329 |
| 2013/0194931 A1* | 8/2013 | Lee | H04L 5/0053 370/241 |
| 2013/0230017 A1* | 9/2013 | Papasakellariou | H04W 72/0406 370/330 |
| 2013/0242890 A1* | 9/2013 | He | H04L 5/1469 370/329 |
| 2014/0112260 A1* | 4/2014 | Sorrentino | H04W 72/0413 370/329 |
| 2014/0341146 A1* | 11/2014 | Nakashima | H04W 72/042 370/329 |
| 2015/0092728 A1 | 4/2015 | Wang et al. | |

FOREIGN PATENT DOCUMENTS

| | | |
|---|---|---|
| EP | 2 863 693 A1 | 4/2015 |
| JP | 2013-255136 A | 12/2013 |
| JP | 2015-513863 A | 5/2015 |
| WO | 2011/021878 A2 | 2/2011 |
| WO | 2013/133611 A1 | 9/2013 |

OTHER PUBLICATIONS

Notice of Preliminary Rejection issued by the Korean Intellectual Property Office for corresponding Korean Patent Application No. 10-2015-7000385, mailed on Jul. 24, 2015, with English translation.
International Search Report issued for corresponding International Patent Application No. PCT/CN2012/076887 mailed Sep. 6, 2012, with an English Translation.
Office Action issued by Rospatent Federal Service for Intellectual Property for corresponding Russian Patent Application No. 2015100884/07(001199), mailed Oct. 29, 2015, with an English translation.
Office Action issued by the Canadian Intellectual Property Office for corresponding Canadian Patent Application No. 2,877,737, dated Jan. 22, 2016.
1st Office Action issued by the Japan Patent Office for corresponding Japanese Patent Application No. 2015-516402, mailed on Jan. 26, 2016, with an English translation.
Papasakellariou et al., U.S. Appl. No. 61/606,772, filed Mar. 5, 2012, and published on Sep. 5, 2013.
Notice of Final Rejection issued by the Korean Intellectual Property Office for corresponding Korean Patent Application No. 10-2015-7000385, mailed on Jan. 20, 2016, with English translation.
Extended European search report with supplementary European search report and the European search opinion issued by the European Patent Office for corresponding European Patent Application No. 12879077.1, mailed on Apr. 29, 2016.
Samsung, "HARQ-ACK PUCCH Resources in Response to E-PDCCH Detections", Agenda Item: 7.6.4, 3GPP TSG-RAN WG1 Meeting #68bis, R1-121647, Jeju, Korea, Mar. 26-30, 2012.
Samsung, "Design Principles of E-PDCCH Search Spaces", Agenda Item: 7.62, 3GPP TSG-RAN WG1 Meeting #68bis, R1-121643, Jeju, Korea, Mar. 26-30, 2012.
ZTE, "Mapping scheme and UE procedure for control signaling enhancement", Agenda Item: 7.7.3, 3GPP TSG-RAN WG1 Meeting #67, R1-114401, San Francisco, USA, Nov. 14-18, 2011.
Notice of Last Preliminary Rejection issued by the Korean Intellectual Property Office for corresponding Korean Patent Application No. 10-2015-7000385, mailed on May 20, 2016, with English translation.
Notice of Preliminary Rejection issued by the Korean Intellectual Property Office for corresponding Korean Patent Application No. 10-2016-7010402, mailed Jul. 15, 2016, with English translation.
Second Office Action issued for corresponding Mexican Patent Application No. MX/a/2014/015301, mailed on Aug. 17, 2016 with an English translation.
Non-Final Office Action issued by the United States Patent and Trademark Office for corresponding U.S. Appl. No. 14/566,162, electronically delivered on Jul. 27, 2016.
Office Action issued by the Canadian Intellectual Property Office for corresponding Canadian Patent Application No. 2,877,737, dated Dec. 9, 2016.

* cited by examiner

601 configuring, by an eNB, different PUCCH calculation formulae for different mapping manners of E-PDCCH of UE, so that the UE determines its PUCCH resources according to a specific parameter configured by the eNB and a PUCCH calculation formula corresponding to its mapping manner of E-PDCCH

FIG.6

701 determining, by UE, a starting point of its PUCCH resources, according to a payload of an E-PDCCH and a mapping manner of its E-PDCCH

702 determining, by the UE, its PUCCH resources according to the starting point of its PUCCH resources and a PUCCH calculation formula

FIG.7

1001
determining a maximum resource index of a PUCCH by UE dynamically according to a payload of an E-PDCCH, or dynamically according to a maximum value preconfigured by a high layer 1002
determining its PUCCH resources by the UE according to a PUCCH calculation formula and the maximum resource index of the PUCCH

METHOD AND APPARATUS FOR DETERMINING UPLINK CONTROL CHANNEL RESOURCES

CROSS-REFERENCE TO RELATED APPLICATIONS

This is a continuation of U.S. application Ser. No. 14/566,162, filed Dec. 10, 2014, now pending, which is a continuation of International Application No. PCT/CN2012/076887, filed Jun. 14, 2012, the contents of which are herein wholly incorporated by reference.

TECHNICAL FIELD

The present invention relates to communication technologies, and in particular to a method and apparatus for determining uplink control channel resources.

BACKGROUND

An uplink control channel (PUCCH, physical uplink control channel) is used to carry ACK/NACK (acknowledgement/negative acknowledgement) feedback for a downlink data channel (PDSCH), such as PUCCH format 1/1a/1b, and may also be used to carry channel status information (CSI) of a downlink channel, such as PUCCH format 1/2a/2b. In Rel. 10, an uplink control channel PUCCH takes a CAZAC (const amplitude zero auto-correlation) sequence as a basic sequence, which is divided into 30 sequence groups, an index of which being denoted by u, u∈{0, 1, 2, ..., 29}; each sequence group contains one or two basis sequences, and v denotes an index of a basic sequence in a sequence group, v=0, 1. A PUCCH basic sequence of a user is decided by a sequence group index u and a basic sequence index v in a sequence group. All users in the same cell employ identical sequence groups, and users in different cells employ different sequence groups. As different users in a cell employ identical sequence group indices, when two users occupy identical uplink physical resource blocks (PRBs) to transmit PUCCHs, orthogonality of PUCCHs in the cell may be ensured by different cyclic shifts (CSs) and/or different orthogonal cover codes (OCCs), so as to ensure relatively low inter-cell interference. And at the same time, multiple users may occupy identical CSs and/or OCCs, but occupy different PRBs, so as to ensure their orthogonality. A physical resource $n_{PUCCH}^{1}$ occupied by a PUCCH corresponds to a combination of a CS, an OCC and a PRB. For dynamic PDSCH transmission, the physical resource $n_{PUCCH}^{1}$ of the PUCCH format 1/1a/1b is dynamically decided by a index of a CCE (control channel element) of a PDCCH (physical downlink control channel) scheduling the PDSCH, $n_{PUCCH}^{1}=n_{CCE}+N_{PUCCH}^{(1)}$; where, $n_{CCE}$ is an initial index of the CCE of the PDCCH, and $N_{PUCCH}^{(1)}$ is a cell common parameter, which is configured via high-layer signaling.

As evolution of a EUTRA (evolved universal terrestrial radio access) network, many new scenarios appear, such as a heterogeneous network having identical or different cell ID. New features of data channel and control channel need to be introduced. And for an enhanced PDCCH, following content needs to be taken into account:

being capable of supporting an increased control channel capacity;

being capable of supporting an ICIC (inter-cell interference coordination) technology in a frequency domain;

being capable of increasing spatial reutilization of a control channel resource;

being capable of supporting beamforming and/or diversity;

being capable of operating in a new carrier type and a MBSFN (multicast broadcast single frequency network) subframe; and being capable of coexisting with conventional UE (user equipment) in the same carrier.

Expected features include having an ability to schedule frequency selection and reduce inter-cell interference. Based on the above demand, an E-PDCCH (enhanced PDCCH) may be in a conventional PDSCH (physical downlink shared channel) area, and frequency division multiplexed with the PDSCH, that is, for at least one user, an E-PDCCH and a PDSCH occupy different physical resource block pairs (PRB pairs), as shown in FIG. 1. In order to improve spectral utilization of an E-PDCCH, a single PRB may carry E-PDCCHs of multiple users. An E-PDCCH has two mapping schemes, that is, localized mapping and distributed mapping, as shown in FIG. 2. For the localized mapping, it is expected to obtain a frequency selection scheduling gain and a frequency selection beamforming gain, i.e. an eNB is capable of transmitting E-PDCCHs in a subcarrier having a relatively good channel response. And for the distributed mapping, it is expected to obtain a frequency diversity gain.

Similar to ACK/NACK feedback of a PDSCH scheduled by a PDCCH, ACK/NACK feedback of a PDSCH scheduled by an E-PDCCH may still be carried by a PUCCH. A physical resource of the PUCCH may be dynamically implicitly decided by parameters including at least $N_{PUCCH}^{(1)}$ and an index of an E-CCE of an E-PDCCH, etc. However, following problems may exist in deduction of the physical resource of the PUCCH:

1) the E-PDCCH has two mapping schemes, the localized mapping and the distributed mapping, the indices of their E-CCEs may be independent; while the PDCCH has only one mapping scheme, and the indices of its CCEs is unified for all the users. Assuming that the PDCCH occupies former three OFDM symbols, a total number of corresponding CCEs is 20, PDCCHs of different users occupy different CCE of these 20 CCEs, for example, a user 1 and a user 2 occupy logically neighboring CCEs, the user 1 occupying #11 CCE, and the user 2 occupying #12 CCE, then PUCCH resources $n_{PUCCH}^{(1)}$ of these two users are different, which are $n_{PUCCH}^{1}=11+N_{PUCCH}^{(1)}$ and $n_{PUCCH}^{1}=12+N_{PUCCH}^{(1)}$, respectively. While for an E-PDCCH, if the user 1 employs the distributed mapping and the user 2 employs the localized mapping, and the user 1 and the user 2 respectively occupy a #1 CCE in a search space of the distributed mapping and a #1 CCE in a search space of the localized mapping, then the PUCCH resources $n_{PUCCH}^{(1)}$ of these two users are identical, which are both $n_{PUCCH}^{1}=1+N_{PUCCH}^{(1)}$, that is, collision of PUCCH resources occurs. Hence, the problem of resource collision in different mapping manners needs to be solved for PUCCH resources to which an E-PDCCH corresponds;

2) in the same mapping manner, resource collision may possibly occur in the PUCCH resources to which an E-PDCCH corresponds. For example, in the localized mapping manner, a search space of each user is independently configured, and the indices of its E-CCEs are also calculated in respective search spaces of the users. Therefore, when E-PDCCHs of two users respectively occupy resources of identical CCE indices in respective search spaces, such as both of them occupy a #1 CCE in the search space of themselves, then the resources $n_{PUCCH}^{(1)}$ of the two users are identical, which are both $n_{PUCCH}^1 = 1+N_{PUCCH}^{(1)}$, that is, collision of PUCCH resources occurs. In order to solve such a problem, introduction of a PRB index may be taken into account to implicitly calculate PUCCH resources; and 3) for the localized mapping manner, in order to obtain the frequency selection scheduling gain, the eNB will transmit E-PDCCHs at best bands of a user. Since best bands of different users are often not neighboring to each other, it is possible that a difference between indices of PRBs mapped by E-PDCCHs of different users may be very large; for example, if E-PDCCH of the user 1 is mapping into a first PRB and E-PDCCH of the user 2 is mapping into a 37th PRB, then PUCCH resources to which the two users correspond may be different PRBs. In an existing PUCCH structure, one PRB may carry 3X PUCCHs, where, X is the maximum number of CSs that can be supported in one PRB. Even though the scheduled users at a certain moment are only the 2 users, resources reserved by a PUCCH are also at least 2 PRBs, which results in that the spectral utilization of the PUCCH is very low. Such a problem is relatively less severe in a PDCCH. As the total overhead of PDCCHs of all users in a cell at a certain moment may be dynamically indicated by a PCFICH (physical control format indicator channel) (taking an OFDM (orthogonal frequency division multiplexing) symbol as a minimum unit), although it cannot be corrected to a CCE, a dynamic range of a CCE is effectively limited, thereby avoiding the above problem of waste of E-PDCCHs.

It should be noted that the above description of the background is merely provided for clear and complete explanation of the present invention and for easy understanding by those skilled in the art. And it should not be understood that the above technical solution is known to those skilled in the art as it is described in the background of the present invention.

SUMMARY

An object of embodiments of the present invention is to provide a method and apparatus for determining uplink control channel resources, so as to solve the problem pointed out in the Background.

According to an aspect of embodiments of the present invention, there is provided a method for determining uplink control channel resources, including:

receiving, by user equipment (UE), a specific parameter configured for a mapping manner of its enhanced physical downlink control channel (E-PDCCH) by an eNB; and determining its uplink control channel (PUCCH) resources by the UE according to the specific parameter corresponding to the mapping manner of its E-PDCCH and a PUCCH calculation formula.

According to an aspect of embodiments of the present invention, there is provided a method for determining uplink control channel resources, including:

configuring, by an eNB, different specific parameters for different mapping manners of an E-PDCCH of UE; and transmitting the different specific parameters by the eNB to the UE, or transmitting a specific parameter corresponding to the mapping manner of the E-PDCCH of the UE to the UE, so that the UE determines its uplink control channel (PUCCH) resources according to the specific parameter corresponding to the mapping manner of its E-PDCCH and a PUCCH calculation formula.

According to an aspect of embodiments of the present invention, there is provided a method for determining uplink control channel resources, including:

determining, by UE, its PUCCH resources, according to a specific parameter configured by an eNB and a PUCCH calculation formula corresponding to a mapping manner of its E-PDCCH.

According to an aspect of embodiments of the present invention, there is provided a method for determining uplink control channel resources, including:

configuring, by an eNB, different PUCCH calculation formulae for different mapping manners of E-PDCCH of UE, so that the UE determines its PUCCH resources according to a specific parameter configured by the eNB and a PUCCH calculation formula corresponding to its mapping manner of E-PDCCH.

According to an aspect of embodiments of the present invention, there is provided a method for determining uplink control channel resources, including:

determining, by UE, a starting point of its PUCCH resources, according to a payload of an E-PDCCH and its mapping manner of E-PDCCH; and determining, by the UE, its PUCCH resources according to the starting point of its PUCCH resources and a PUCCH calculation formula.

According to an aspect of embodiments of the present invention, there is provided a method for determining uplink control channel resources, including:

determining a maximum resource index of a PUCCH by UE dynamically according to a payload of an E-PDCCH, or dynamically according to a maximum value preconfigured by a high layer; and determining its PUCCH resources by the UE according to a PUCCH calculation formula and the maximum resource index of the PUCCH.

According to an aspect of embodiments of the present invention, there is provided a method for determining uplink control channel resources, including:

configuring times of payloads by an eNB; and transmitting the times of payloads by the eNB to UE, so that the UE determines a payload of its E-PDCCH according to the times of payloads and a payload of an E-PDCCH in distributed mapping indicated by a received EPCFICH, determines a maximum resource index of its PUCCH according to the payload of its E-PDCCH, and determines its PUCCH resources according to a PUCCH calculation formula and the maximum resource index of its PUCCH.

According to an aspect of embodiments of the present invention, there is provided a method for determining uplink control channel resources, including:

configuring multiple E-PDCCH payloads by an eNB; and transmitting the multiple E-PDCCH payloads and payload indication information by the eNB to UE, so that the UE determines a payload of its E-PDCCH according to the payload indication information, determines a maximum resource index of its PUCCH according to the payload of its E-PDCCH, and determines its PUCCH resources according to a PUCCH calculation formula and the maximum resource index of its PUCCH.

According to an aspect of embodiments of the present invention, there is provided UE, including:

a receiving unit configured to receive a specific parameter configured for a mapping manner of an enhanced physical downlink control channel (E-PDCCH) of the UE by an eNB; and a determining unit configured to determine uplink control channel (PUCCH) resources of the UE according to the specific parameter corresponding to the mapping manner of the E-PDCCH of the UE and a PUCCH calculation formula.

According to an aspect of embodiments of the present invention, there is provided an eNB, including:

a configuring unit configured to configure different specific parameters for different mapping manners of E-PDCCH of UE; and a transmitting unit configured to transmit the different specific parameters to the UE, or transmit a specific parameter corresponding to the mapping manner of the E-PDCCH of the UE to the UE, so that the UE determines its uplink control channel (PUCCH) resources according to the specific parameter corresponding to the mapping manner of its E-PDCCH and a PUCCH calculation formula.

According to an aspect of embodiments of the present invention, there is provided UE, including:

a determining unit configured to determine PUCCH resources of the UE according to a specific parameter configured by an eNB and a PUCCH calculation formula corresponding to a mapping manner of E-PDCCH of the UE.

According to an aspect of embodiments of the present invention, there is provided an eNB, including:

a configuring unit configured to configure different PUCCH calculation formulae for different mapping manners of E-PDCCH of UE, so that the UE determines its PUCCH resources according to a specific parameter configured by the eNB and a PUCCH calculation formula corresponding to its mapping manner of E-PDCCH.

According to an aspect of embodiments of the present invention, there is provided UE, including:

a first determining unit configured to determine a starting point of PUCCH resources of the UE according to a payload of an E-PDCCH and a mapping manner of E-PDCCH of the UE; and a second determining unit configured to determine PUCCH resources of the UE according to the starting point of the PUCCH resources of the UE and a PUCCH calculation formula.

According to an aspect of embodiments of the present invention, there is provided UE, including:

a first determining unit configured to determine a maximum resource index of a PUCCH, dynamically according to a payload of an E-PDCCH, or dynamically according to a maximum value preconfigured by a high-layer; and a second determining unit configured to determine PUCCH resources of the UE, according to a PUCCH calculation formula and the maximum resource index of the PUCCH.

According to an aspect of embodiments of the present invention, there is provided an eNB, including:

a configuring unit configured to configure times of payloads; and a transmitting unit configured to transmit the times of payloads to UE, so that the UE determines a payload of its E-PDCCH according to the times of payloads and a payload of an E-PDCCH in distributed mapping indicated by a received EPCFICH, determines a maximum resource index of its PUCCH according to the payload of its E-PDCCH, and determines its PUCCH resources according to a PUCCH calculation formula and the maximum resource index of its PUCCH.

According to an aspect of embodiments of the present invention, there is provided an eNB, including:

a configuring unit configured to configure multiple E-PDCCH payloads; and a transmitting unit configured to transmit the multiple E-PDCCH payloads and payload indication information to UE, so that the UE determines a payload of its E-PDCCH according to the payload indication information, determines a maximum resource index of its PUCCH according to the payload of its E-PDCCH, and determines its PUCCH resources according to a PUCCH calculation formula and the maximum resource index of its PUCCH.

According to an aspect of embodiments of the present invention, there is provided a computer-readable program, wherein when the program is executed in UE, the program enables a computer to carry out the method for determining uplink control channel resources as described above in the UE.

According to an aspect of embodiments of the present invention, there is provided a storage medium in which a computer-readable program is stored, wherein the computer-readable program enables a computer to carry out the method for determining uplink control channel resources as described above in UE.

According to an aspect of embodiments of the present invention, there is provided a computer-readable program, wherein when the program is executed in an eNB, the program enables a computer to carry out the method for determining uplink control channel resources as described above in the eNB.

According to an aspect of embodiments of the present invention, there is provided a storage medium in which a computer-readable program is stored, wherein the computer-readable program enables a computer to carry out the method for determining uplink control channel resources as described above in an eNB.

An advantage of embodiments of the present invention exists in that with the embodiments of the present invention, collision of PUCCH resources of different UE is lowered, and/or spectral efficiencies of the PUCCHs are improved.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be enlarged or reduced. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment. In the drawings:

FIG. 6 is flowchart of a method for determining uplink control channel (PUCCH) resources of Embodiment 4;

FIG. 7 is flowchart of a method for determining uplink control channel (PUCCH) resources of Embodiment 5;

DETAILED DESCRIPTION

Above and other features of embodiments of the present invention will become apparent according to the following description with reference to the drawings. These embodiments are illustrative only, and are not intended to limit the present invention. For the principle and implementation modes of the present invention to be easily understood by those skilled in the art, the implementation modes of the present invention shall be described taking ACK/NACK feedback of a PDSCH scheduled by an E-PDCCH as an example. However, it should be understood that the present invention is not limited to the above scenario, and is applicable to other scenarios related to determination of PUCCH resources.

Embodiment 1

Figure 1:
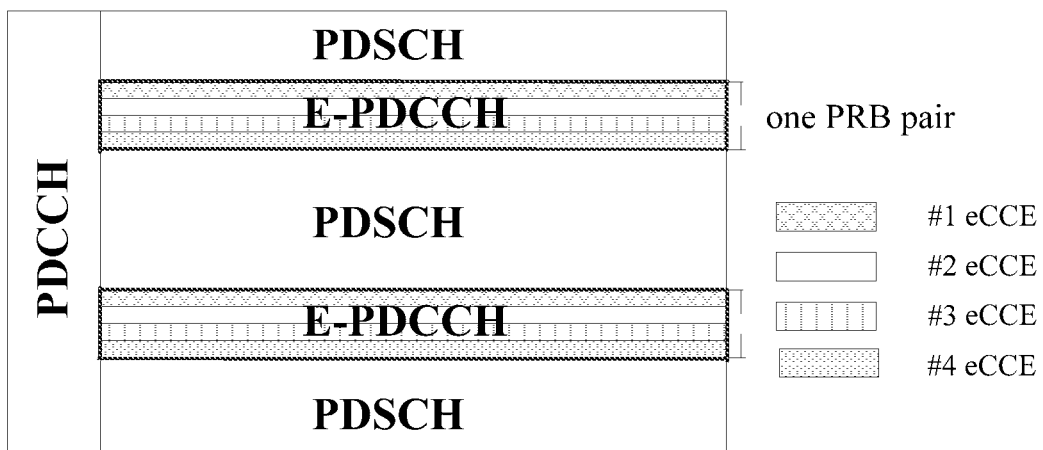
FIG. 1 is schematic diagrams of a PDSCH, a PDCCH and an E-PDCCH.
Figure 2A:
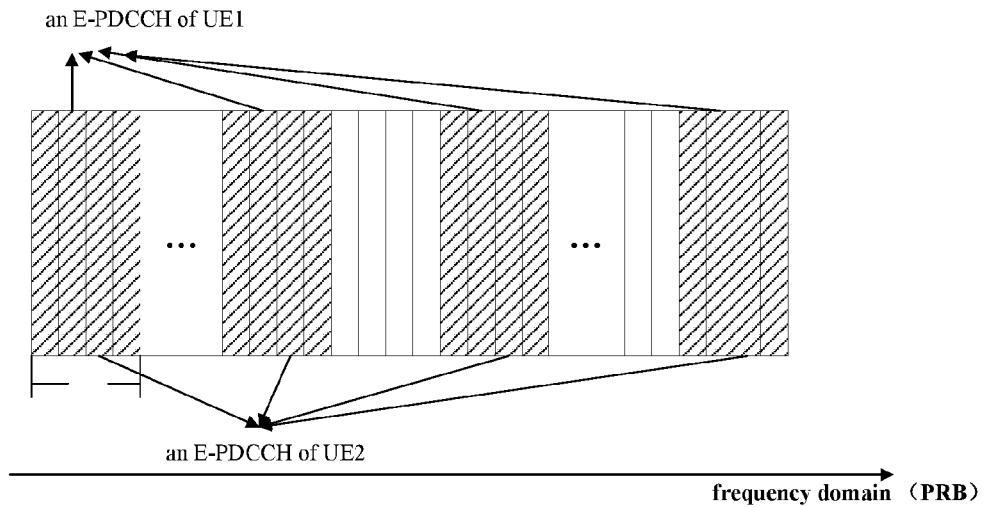
FIG. 2A is a schematic diagram of a distributed mapping manner of an E-PDCCH.
Figure 2B:
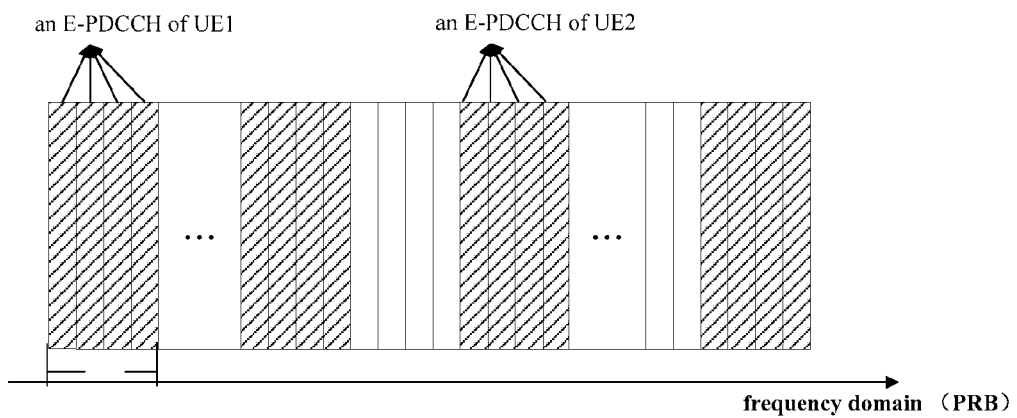
FIG. 2B is a schematic diagram of a localized mapping manner of an E-PDCCH.
Figure 3:
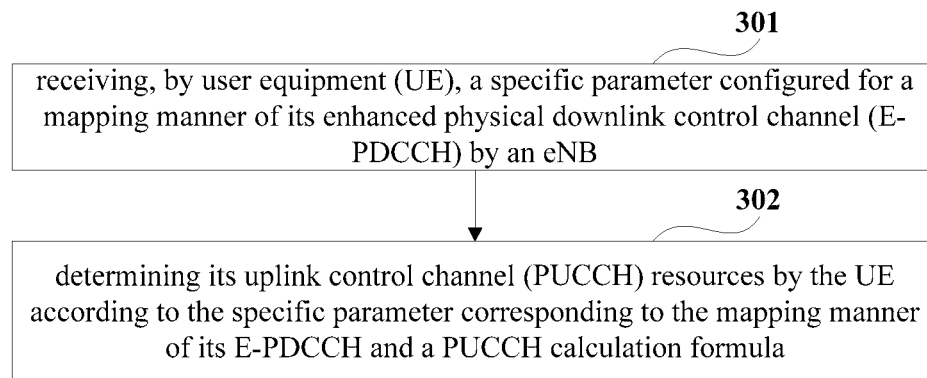
FIG. 3 is flowchart of a method for determining uplink control channel (PUCCH) resources of Embodiment 1.

An embodiment of the present invention provides a method for determining uplink control channel (PUCCH) resources. FIG. 3 is a flowchart of the method. Referring to FIG. 3, the method includes:

step 301: receiving, by user equipment (UE), a specific parameter configured for a mapping manner of its enhanced physical downlink control channel (E-PDCCH) by an eNB;

wherein, the specific parameter here may be a cell-specific common parameter, and may also be a UE-specific parameter, which is semi-statically configured by a high layer; in the following description, the specific parameter is denoted by $N_{PUCCH}^{(1)}$; however, the embodiments of the present invention are not limited thereto;

step 302: determining its uplink control channel (PUCCH) resources by the UE according to the specific parameter corresponding to the mapping manner of its E-PDCCH and a PUCCH calculation formula.

In this embodiment, the eNB configures different mapping manners of E-PDCCHs of the UE with different specific parameters $N_{PUCCH}^{(1)}$, that is $N_{PUCCH}^{(1)}$ of PUCCH resources to which E-PDCCHs of the distributed mapping and the localized mapping corresponds are different. Therefore, even though indices of CCEs of search spaces occupied by different UE in respective mapping manners of E-PDCCHs are identical, collision of PUCCH resources will not occur, as different specific parameters $N_{PUCCH}^{(1)}$ are employed.

In this embodiment, a PUCCH calculation formula for determining PUCCH resources is not limited. For example, an existing PUCCH calculation formula may be employed:

$$n_{PUCCH}^{1} = n_{CCE} + N_{PUCCH}^{(1)};$$

where, $n_{CCE}$ is an initial index of CCEs of the E-PDCCH, and $N_{PUCCH}^{(1)}$ is a specific parameter configured by the eNB for different mapping manners of E-PDCCHs. Assuming that the specific parameter configured by the eNB for E-PDCCH in the localized mapping manner is $N_{PUCCH}^{(1)\_localized}$, and the specific parameters configured by the eNB for E-PDCCH in the distributed mapping manner are $N_{PUCCH}^{(1)\_distributed}$, PUCCH resources of the user 1 is $n_{PUCCH}^{1} = n_{CCE} + N_{PUCCH}^{(1)\_distributed}$, and PUCCH resources of the user 2 is $n_{PUCCH}^{1} = n_{CCE} + N_{PUCCH}^{(1)\_localized}$; and as $N_{PUCCH}^{(1)\_distributed} \ne N_{PUCCH}^{(1)\_localized}$, collision of PUCCH resources may be avoided.

The above formulae are illustrative only, and this embodiment is not limited thereto.

In this embodiment, after the eNB configures different mapping manners of E-PDCCHs of the UE with different specific parameters, the eNB may transmit a specific parameter corresponding to a mapping manner of an E-PDCCH of the UE to the UE, and may also transmit all the specific parameters to which the two mapping manners correspond to the UE, so that the UE may determine a corresponding specific parameter according the mapping manner of its E-PDCCH. Hence, in this embodiment, step 301 may include:

receiving, by the UE, the specific parameter corresponding to the mapping manner of its E-PDCCH transmitted by the eNB; or receiving, by the UE, specific parameters configured for different mapping manners of E-PDCCH transmitted by the eNB, and determining its specific parameter according to the mapping manner of its E-PDCCH.

That is, the eNB may transmit all the different specific parameters configured for different mapping manners of E-PDCCH to the UE, and the UE determines a corresponding specific parameter according to the mapping manner of its E-PDCCH. Or, the eNB may transmit only the specific parameter corresponding to the mapping manner of the E-PDCCH of the UE to the UE, hence the UE may directly obtain the specific parameter corresponding to the mapping manner of its E-PDCCH.

With the method of this embodiment, different specific parameters are employed for different mapping manners of E-PDCCH, thereby lowering the problem of collision of PUCCH resources of different UE.

Embodiment 2

Figure 4:
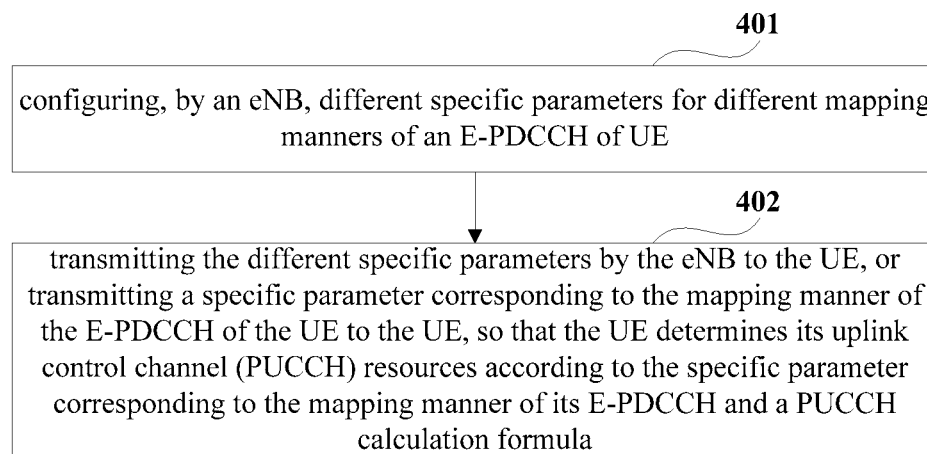
FIG. 4 is flowchart of a method for determining uplink control channel (PUCCH) resources of Embodiment 2.

An embodiment of the present invention further provides a method for determining uplink control channel resources, which is processing at an eNB side to which the method of Embodiment 1 corresponds. FIG. 4 is a flowchart of the method. Referring to FIG. 4, the method includes:

step 401: configuring, by an eNB, different specific parameters for different mapping manners of an E-PDCCH of UE; and step 402: transmitting the different specific parameters by the eNB to the UE, or transmitting a specific parameter corresponding to the mapping manner of the E-PDCCH of the UE to the UE, so that the UE determines its uplink control channel (PUCCH) resources according to the specific parameter corresponding to the mapping manner of its E-PDCCH and a PUCCH calculation formula.

In this embodiment, as the E-PDCCH may be mapped in the distributed manner, and may also be mapped in the localized manner, the eNB of this embodiment configures different specific parameters for the E-PDCCHs mapped in the distributed manner and the E-PDCCHs mapped in the localized manner. Hence, a user of the E-PDCCH mapped in the distributed manner and a user of the E-PDCCH mapped in the localized manner use different specific parameters to calculate their PUCCH resources, thereby lowering a possibility of collision of PUCCH resources.

In this embodiment, as the processing at the UE side has been described in Embodiment 1, it shall not be described herein any further.

With the method of this embodiment, the eNB configures different mapping manners of E-PDCCHs with different specific parameters, thereby avoiding the problem of collision of PUCCH resources of different UE.

Embodiment 3

Figure 5:
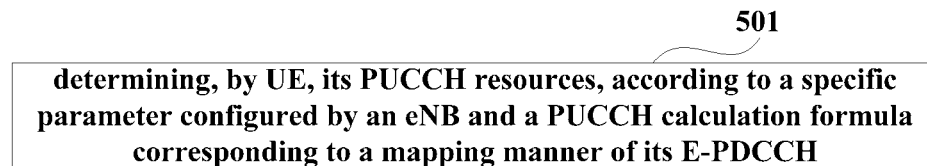
FIG. 5 is flowchart of a method for determining uplink control channel (PUCCH) resources of Embodiment 3.

An embodiment of the present invention further provides a method for determining uplink control channel resources. FIG. 5 is a flowchart of the method. Referring to FIG. 5, the method includes:

step 501: determining, by UE, its PUCCH resources, according to a specific parameter configured by an eNB and a PUCCH calculation formula corresponding to a mapping manner of its E-PDCCH.

In this embodiment, identical specific parameters $N_{PUCCH}^{(1)}$ may be employed, but different PUCCH calculation formulae are employed. That is, the eNB configures different mapping manners of E-PDCCH of the UE with different PUCCH calculation formulae, so that collision will not occur in UE occupying different E-PDCCH physical resources and employing different mapping manners of E-PDCCHs in calculating PUCCH resources. Of course, this embodiment is not limited thereto. For example, the methods of embodiments 1 and 2 may be combined, the eNB may configure different mapping manners of E-PDCCH with different specific parameters $N_{PUCCH}^{(1)}$ at the same time, and the UE may determine its PUCCH resources according to a corresponding specific parameter $N_{PUCCH}^{(1)}$ and a corresponding PUCCH calculation formula based on mapping manner of its E-PDCCH.

In an embodiment, the eNB configures the E-PDCCH mapped in the localized manner with the following PUCCH calculation formula:

$$n_{PUCCH}^{(1)} = N_{PUCCH}^{(1)} + Z \times N_{RB}^{index} + Y \times n_{CCE};$$

when the mapping manner of the E-PDCCH of the UE is the localized mapping, the UE may determine its PUCCH resources according to the above formula; where, $N_{PUCCH}^{(1)}$ is a specific parameter semi-statically configured by a high layer, $N_{RB}^{index}$ is an index of a physical resource block (PRB) occupied by the E-PDCCH, Z is a maximum number of pieces of downlink control information (DCI) carried in each PRB in the distributed mapping, Y is a ratio of the maximum number of pieces of DCI carried in each PRB in the distributed mapping and a maximum number of pieces of DCI carried in each PRB in the localized mapping; wherein, it is preferred that Z is 8 or 16 and Y=Z/X; and $n_{CCE}$ is an index of a control channel element (eCCE) in each PRB; wherein, $n_{CCE}$=0, 1, ... X−1, and $n_{CCE}$ may be a lowest eCCE index corresponding to the E-PDCCH, may also be an eCCE index corresponding to the E-PDCCH and associated with a demodulation reference symbol (DM-RS) port.

In an embodiment, the eNB configures the E-PDCCHs mapped in the distributed manner with the following PUCCH calculation formula:

$$n_{PUCCH}^{(1)} = N_{PUCCH}^{(1)} + Z \times N_{RB}^{index} + n_{CCE};$$

when the mapping manner of the E-PDCCH of the UE is the distributed mapping, the UE may determine its PUCCH resources according to the above formula; where, $N_{PUCCH}^{(1)}$ is a specific parameter semi-statically configured by a high layer, $N_{RB}^{index}$ is an index of a PRB occupied by the E-PDCCH, Z is a maximum number of pieces of DCI carried in each PRB in the distributed mapping, and $n_{CCE}$ is an index of a resource element group (eREG) or an eCCE or DCI in each PRB; wherein, $n_{CCE}$=0, 1, ... Z−1, and $n_{CCE}$ may be a lowest eCCE index corresponding to the E-PDCCH, or an eCCE index corresponding to the E-PDCCH and associated with a DM-RS port.

The above PUCCH calculation formulae respectively configured by the eNB for the E-PDCCHs mapped in the localized manner and the distributed manner are illustrative only, and the embodiments of the present invention are not limited thereto. In particular implementation, the eNB may also configure different mapping manners of E-PDCCH with other different PUCCH calculation formulae, taking other conditions into account, only if PUCCH calculation formulae to which the different mapping manners of E-PDCCH correspond are different, which are covered by the protection scope of the present invention.

For example, for the E-PDCCH mapped in the localized manner, a formula $n_{PUCCH}^{(1)} = N_{PUCCH}^{(1)} + Z \times N_{RB}^{index} + Y \times n_{CCE} + n_{AP}$ may be configured, and for the E-PDCCH mapped in the distributed manner, a formula $n_{PUCCH}^{(1)} = N_{PUCCH}^{(1)} + Z \times N_{RB}^{index} + n_{CCE} + n_{AP}$ may be configured; where, $n_{AP}$ is an index of a antenna port (DM-RS) to which an E-PDCCH corresponds; for example, if an E-PDCCH corresponds to DM-RS port 7, $n_{AP}$=0, and if an E-PDCCH corresponds to DM-RS port 10, $n_{AP}$=3.

For another example, for the E-PDCCH mapped in the localized manner, a formula $n_{PUCCH}^{(1)} = N_{PUCCH}^{(1)} + Z \times N_{RB}^{index} + Y \times n_{CCE} + ARI$ may be configured, and for the E-PDCCH mapped in the distributed manner, a formula $n_{PUCCH}^{(1)} = N_{PUCCH}^{(1)} + Z \times N_{RB}^{index} + n_{CCE} + ARI$ may be configured; where, ARI is another parameter configured by a high layer.

In the above two examples, $Z \times N_{RB}^{index}$ is also optional.

With the method of this embodiment, different PUCCH calculation formulae are employed for different mapping manners of E-PDCCH, thereby lowering the problem of collision of PUCCH resources of different UE.

Embodiment 4

An embodiment of the present invention further provides a method for determining uplink control channel resources, which is processing at an eNB side to which the method of Embodiment 3 corresponds. FIG. 6 is a flowchart of the method. Referring to FIG. 6, the method includes:

step 601: configuring, by an eNB, different PUCCH calculation formulae for different mapping manners of E-PDCCH of UE, so that the UE determines its PUCCH resources according to a specific parameter configured by the eNB and a PUCCH calculation formula corresponding to its mapping manner of E-PDCCH.

Wherein, a type of PUCCH calculation formulae configured by the eNB is not limited in this embodiment of the present invention, only if the PUCCH calculation formulae configured by the eNB for different mapping manners of E-PDCCH are different, which are covered by the protection scope of the present invention.

Wherein, examples of PUCCH calculation formulae configured by the eNB for different mapping manners of E-PDCCH are described in Embodiment 3, which are incorporated herein, and shall not be described herein any further.

With the method of this embodiment, different PUCCH calculation formulae are configured by the eNB for different mapping manners of E-PDCCH, so that UE of different mapping manners of E-PDCCHs may calculate its PUCCH resources according to different PUCCH calculation formulae, thereby avoiding the problem of collision of PUCCH resources.

Embodiment 5

An embodiment of the present invention further provides a method for determining uplink control channel resources. FIG. 7 is a flowchart of the method. Referring to FIG. 7, the method includes:

step 701: determining, by UE, a starting point of its PUCCH resources, according to a payload of an E-PDCCH and a mapping manner of its E-PDCCH; and step 702: determining, by the UE, its PUCCH resources according to the starting point of its PUCCH resources and a PUCCH calculation formula.

In this embodiment, in order to differentiate different mapping manners of E-PDCCH, so as to avoid resource collision, the eNB configures the different mapping manners of E-PDCCH with different starting points of PUCCH resources, so that a starting point of one of the mapping manners is in close proximity to a possible maximum resource index of a PUCCH in another mapping manner. Therefore, in calculating the PUCCH resources by the UE, the UE may determine a starting point of its PUCCH resources according to the payload (i.e. a total overhead) of the E-PDCCH and the mapping manner of its E-PDCCH. As corresponding to different mapping manners of E-PDCCHs, the PUCCH resources are calculated based on different starting points of PUCCH resources, collision of PUCCH resources of different UE is avoided.

In an embodiment, the eNB indicates the total overhead of the E-PDCCH mapped in the distributed manner via a physical control format indicator channel (EPCFICH), such as indicating the number of eCCEs or the number of PRBs in each transmission time interval (TTI). And at the same time, after the eNB configures the PUCCH resources to which E-PDCCH mapped in the localized manner correspond tightly close to the maximum index of the PUCCH resources to which the E-PDCCHs mapped in the distributed manner, the UE may determine the starting point of its PUCCH resources accordingly. For example, if the E-PDCCH of the UE are mapped in the distributed manner, the UE may determine that the starting point of its PUCCH resources is 0; and if the E-PDCCH of the UE are mapped in the localized manner, the UE may determine that the starting point of its PUCCH resources is the maximum index of the PUCCH resources to which the E-PDCCH mapped in the distributed manner correspond.

For example, assuming that the number of eCCEs indicated by the EPCFICH is $N_{ePDCCH}^{distributed}$, or the number of PRBs indicated by the EPCFICH is $N_{ePDCCH}^{RB}$, and the number of eCCEs $N_{ePDCCH}^{distributed} = X N_{ePDCCH}^{RB}$, X being the number of eCCEs carried in each PRB, for UE of which the mapping manner of E-PDCCH is the distributed manner, its PUCCH resources may be determined through calculation by using the formula below $n_{PUCCH}^{(1)} = N_{PUCCH}^{(1)} + n_{CCE}$; and for UE of which the mapping manner of E-PDCCH is the localized manner, its PUCCH resources may be determined through calculation by using the formula below:
$n_{PUCCH}^{(1)} = N_{PUCCH}^{(1)} + n_{CCE} + N_{ePDCCH}^{distributed}$ or
$n_{PUCCH}^{(1)} = N_{PUCCH}^{(1)} + X \times N_{RB}^{index} + n_{CCE} + N_{ePDCCH}^{distributed}$.

In this embodiment, similar to embodiments 1 and 3, the above PUCCH calculation formulae are also illustrative only, this embodiment is not limited thereto, and any calculation formula for calculating PUCCH resources are all covered by the protection scope of the present invention.

With the method of this embodiment, different staring points of PUCCH resources are employed corresponding to different mapping manners of E-PDCCH, thereby lowering the problem of collision of PUCCH resources of different UE.

For the methods of embodiments 1, 3 and 5 to be more clear and easy to be understood, they shall be described below with reference to FIGS. 8a, 8b and 9.

Figure 8A:
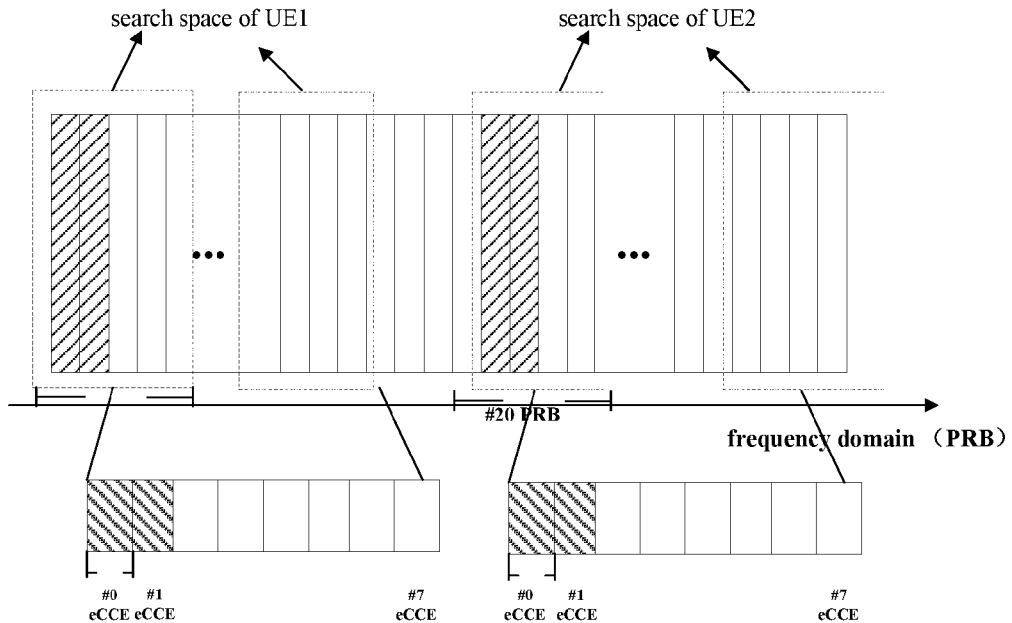
FIG. 8A is a schematic diagram of eCCE indices of E-PDCCHs of different UE in the localized mapping manner.
Figure 8B:
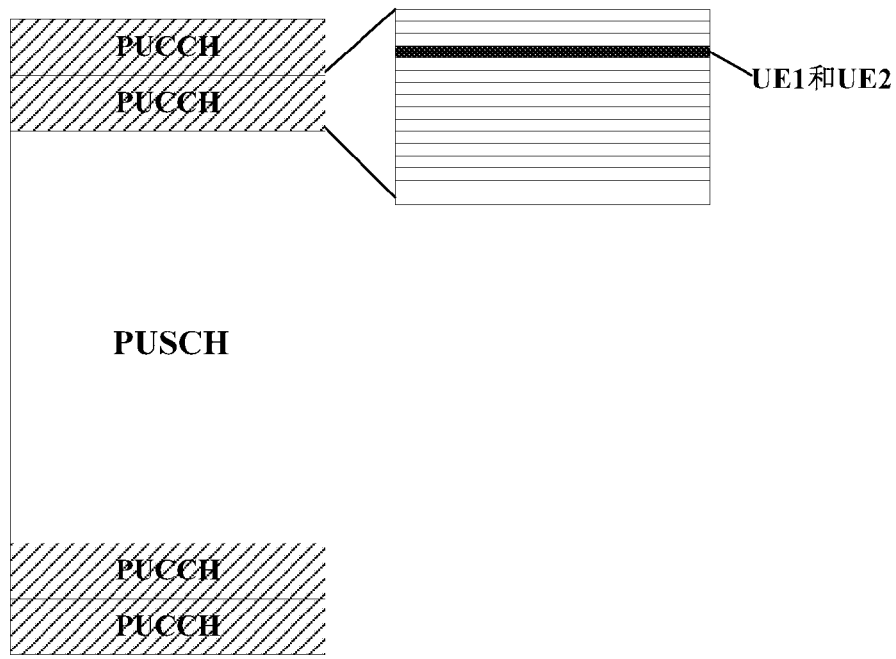
FIG. 8B is a schematic diagram of PUCCH resources of E-PDCCHs of different UE in the localized mapping manner.

FIGS. 8a and 8b are schematic diagrams of eCCE indices and corresponding PUCCH resources of E-PDCCHs of different UE in the localized mapping manner. As shown in FIGS. 8a and 8b, although UE1 and UE2 occupy different physical resources, as CCE index positions in their respective search spaces are identical, PUCCH resources obtained through calculation by using formula $n_{PUCCH}^{(1)} = n_{CCE} + N_{PUCCH}^{(1)}$ are identical, thereby resulting in resource collision. In order to solve such a problem, an index of a PRB may be introduced. For example, the above formula may be modified as:

$$n_{PUCCH}^{(1)} = N_{PUCCH}^{(1)} + X \times N_{RB}^{index} + n_{CCE};$$

where, $N_{RB}^{index}$ is an index of a PRB occupied by an E-PDCCH, $n_{CCE}$ is an index of an eCCE in each PRB, and X is the number of eCCEs carried in each PRB, preferably, X=2 or 3 or 4; taking that X=4 as an example, the PUCCH resources of the UE1 corresponding to its E-PDCCH is $n_{PUCCH}^{(1)} = N_{PUCCH}^{(1)} + 4 + 1$, and the PUCCH resources of the UE2 corresponding to its E-PDCCH is $n_{PUCCH}^{(1)} = N_{PUCCH}^{(1)} + 80 + 1$, wherein, $n_{CCE} = 0, 1, \ldots X-1$, and $n_{CCE}$ may be a lowest eCCE index corresponding to the E-PDCCH, or an eCCE index corresponding to the E-PDCCH and associated with a DM-RS port.

However, although the problem of PUCCH resource collision between UE of which the mapping manner of the E-PDCCHs is the localized manner may be solved by introducing a PRB index, as the indices of $n_{CCE}$ are independent for the different mapping manners of E-PDCCHs, the problem of PUCCH resource collision between UE of which the mapping manners of the E-PDCCHs are different cannot be solved.

Figures 9, 10:
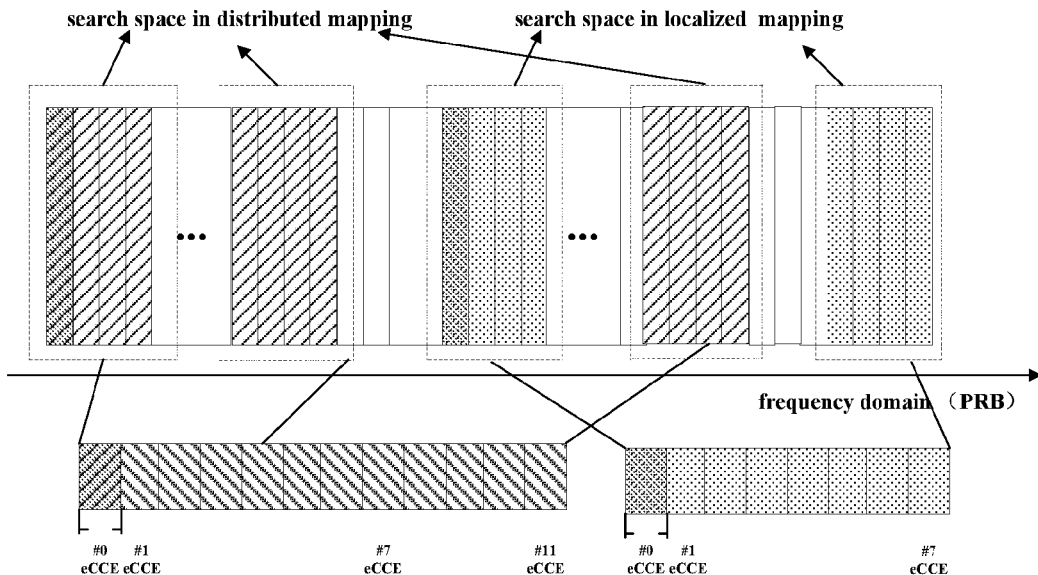
FIG. 9 is a schematic diagram of eCCE indices of E-PDCCHs in different mapping manners.
FIG. 10 is flowchart of a method for determining uplink control channel (PUCCH) resources of Embodiment 6.

FIG. 9 is a schematic diagram of eCCE indices of E-PDCCHs in different mapping manners. As shown in FIG. 9, the UE1 and UE2 use different mapping manners, the UE1 uses the distributed mapping, and the UE2 uses the localized mapping. Although the UE1 and UE2 occupy different physical resources, as CCE index positions in their respective search spaces are identical, PUCCH resources obtained through calculation by using formula $n_{PUCCH}^{(1)}=n_{CCE}+N_{PUCCH}^{(1)}$ are identical, thereby resulting in resource collision.

In view of the problem of PUCCH resource collision in the scenarios shown in FIGS. 8a, 8b and 9, the method of this embodiment of the present invention is proposed.

With the method of Embodiment 1, if different mapping manners of E-PDCCH employ different $N_{PUCCH}^{(1)}$, the problem of PUCCH resource collision in the above two scenarios may be avoided.

With the method of Embodiment 3, if different mapping manners of E-PDCCH employ identical $N_{PUCCH}^{(1)}$, but use of different PUCCH calculation formulae may also make that collision will not occur in UE occupying different E-PDCCH physical resources and employing different mapping/transmission manners of E-PDCCHs in calculating PUCCH resources.

With the method of Embodiment 5, if the total overhead of the E-PDCCH mapped in the distributed manner may be obtained in a real-time manner, such as being indicated by an EPCFICH in each TTI, then the PUCCH resources to which the E-PDCCH mapped in the localized manner correspond may be arranged closed proximity after the maximum index of the PUCCH resources to which the E-PDCCH mapped in the distributed manner correspond. As the starting points of the PUCCH resources in different mapping manners of E-PDCCHs are different, for UE in the distributed mapping manner, its PUCCH resources may be calculated as $n_{PUCCH}^{(1)}=N_{PUCCH}^{(1)}+n_{CCE}$, and for UE in the localized mapping manner, its PUCCH resources may be calculated as $n_{PUCCH}^{(1)}=N_{PUCCH}^{(1)}+n_{CCE}+N_{epDCCH}^{distributed}$ or $n_{PUCCH}^{(1)}=N_{PUCCH}^{(1)}+X\times N_{RB}^{index}+n_{CCE}+N_{ePDCCH}^{distributed}$, thereby avoiding resource collision in the scenarios shown in FIGS. 8 and 9.

Embodiment 6

An embodiment of the present invention further provides a method for determining uplink control channel resources. FIG. 10 is a flowchart of the method. Referring to FIG. 10, the method includes:

step 1001: determining a maximum resource index of a PUCCH by UE dynamically according to a payload of an E-PDCCH, or dynamically according to a maximum value preconfigured by a high layer; and step 1002: determining its PUCCH resources by the UE according to a PUCCH calculation formula and the maximum resource index of the PUCCH.

In this embodiment, the eNB presets a maximum resource index, and when the UE determines its PUCCH resources (i.e. the PUCCH resources needed by ACK/NACK feedback of the PDSCHs scheduled by the E-PDCCH), an index of its PUCCH resources is made to be not in excess of the preset maximum resource index, thereby avoiding the problem of resource collision.

Wherein, the maximum resource index may be determined according to the payload of the E-PDCCH, and may also be dynamically determined according to a maximum value preconfigured by a high layer, and this embodiment is not limited thereto. Wherein, the maximum value preconfigured by the high layer also takes the payload of the E-PDCCH into account.

Wherein, in the manner of dynamically determining the maximum resource index according to the payload of the E-PDCCH, the payload of the E-PDCCH may be obtained directly or indirectly according to the EPCFICH, and may also be jointly obtained according to the EPCFICH and high-layer signaling. For example, the EPCFICH may indicate the number of eCCEs to which the E-PDCCHs of all the UE correspond, that is, including the total number of eCCEs mapped in the distributed manner and the localized manner. Therefore, the UE may directly or indirectly obtain the payload of the E-PDCCH according to the EPCFICH, and further determine the maximum resource index of the PUCCH accordingly. For another example, the EPCFICH may only indicate the number $N_{ePDCCH}^{distributed}$ of the eCCEs to which the E-PDCCHs of all the UE in the distributed mapping manner correspond, and a parameter L may be configured by a high layer, and take $N_{ePDCCH}^{load}=L\times N_{ePDCCH}^{distributed}$ to denote the number of the eCCEs of the E-PDCCHs of all the UE. Hence, the UE may jointly obtain the payload of the E-PDCCH according to the EPCFICH and high-layer signaling, thereby determining the maximum resource index of the PUCCH.

Wherein, in the manner of dynamically determining the maximum resource index according to the maximum value preconfigured by a high layer, if the eNB does not transmit the EPCFICH to the UE, that is, there exists no EPCFICH, multi $N_{ePDCCH}^{load}$ may be configured by a high layer and a bit is added or an existing bit is multiplexed in DCI of the E-PDCCH, so as to dynamically indicate which $N_{ePDCCH}^{load}$ is employed. Hence, the UE may determine the payload of the E-PDCCH according to high-layer signaling and dynamic indication, thereby determining the maximum resource index of the PUCCH accordingly.

In an implementation mode of step 1002, the UE may determine its PUCCH resources by performing modular operation on the maximum resource index of the PUCCH by using a value obtained through calculation according to a PUCCH calculation formula.

In another implementation mode of step 1002, other items may be added, so as to lower a possibility of collision brought by modular operation (remainder operation).

For the method of this embodiment to be more clear and easy to be understood, it shall be described below with reference to FIG. 11.

Figure 11A:
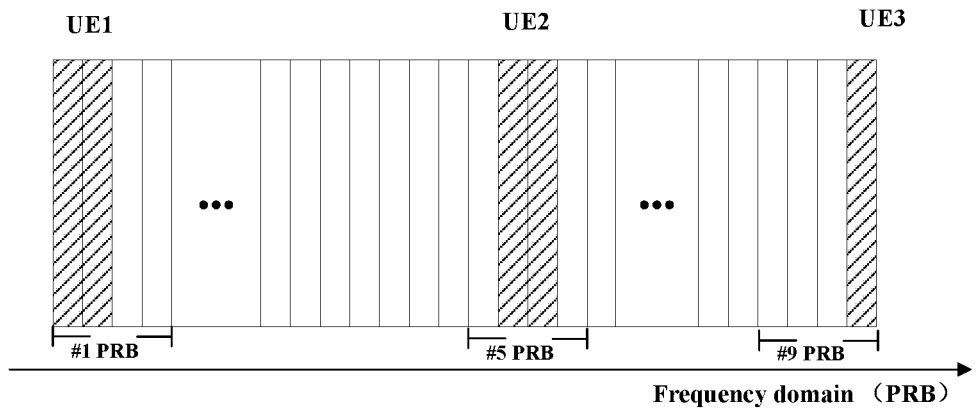
FIG. 11A is a schematic diagram of E-PDCCH mapping of E-PDCCHs of different UE in the localized mapping manner.
Figure 11B:
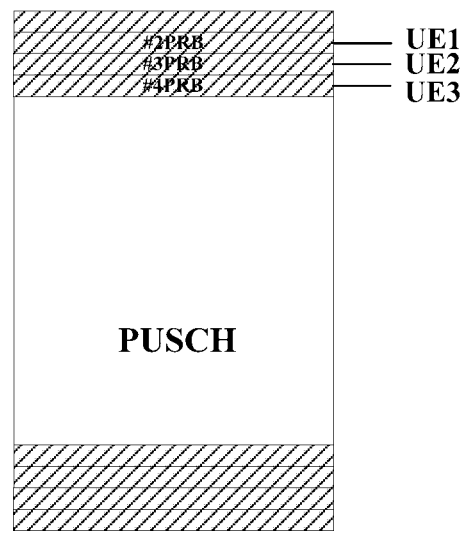
FIG. 11B is a schematic diagram of PUCCH resources of E-PDCCHs of different UE in the localized mapping manner.

As shown in FIG. 11, at a certain moment, the eNB schedules only three pieces of UE, that is, transmitting E-PDCCHs scheduling transmission of PDSCHs to the three pieces of UE. If the E-PDCCHs of the three pieces of UE are transmitted in PRBs spaced relatively far away from each other, and as shown in FIG. 11, they are transmitted in a first PRB, a fifth PRB and a ninth PRB, respectively, then the PUCCH resources to which the three pieces of UE correspond are $n_{PUCCH}^{(1)}=N_{PUCCH}^{(1)}+4+1$, $n_{PUCCH}^{(1)}=N_{PUCCH}^{(1)}+20+2$ and $n_{PUCCH}^{(1)}=N_{PUCCH}^{(1)}+36+2$. Assuming that at most 6 CSs and 3 OCCs may be supported in each PRB, that is, a PRB may carry 18 different $n_{PUCCH}^{(1)}$, for simplicity, assuming that $N_{PUCCH}^{(1)}=18$, the PRBs to which the PUCCHs of the three pieces of UE correspond are a second PRB, a third PRB and a fourth PRB, respectively. However, three PRBs may actually accommodate at most 54 pieces of UE, and in this embodiment, there are only three pieces of UE, which still occupy 3 PRBs, resulting in that the spectral utilization of the PUCCHs are very low.

In order to effectively improve the efficiency, an index of PUCCH resources may be limited to be not in excess of the preset maximum resource index by using the method of this embodiment. The maximum resource index may be dynamically determined according to the payload of the E-PDCCH, or dynamically determined according to the maximum value configured by a high layer.

Wherein, in the manner of dynamically determining the maximum resource index according to the payload of the E-PDCCH, the payload of the E-PDCCH may be obtained directly or indirectly according to the EPCFICH, and may also be jointly obtained according to the EPCFICH and high-layer signaling. And wherein, in the manner of dynamically determining the maximum resource index according to the maximum value preconfigured by a high layer, the maximum resource index may be obtained via high-layer signaling and the dynamic indication information.

For example, assuming that the maximum resource index is $N_{ePDCCH}^{load}-1$, the PUCCH resources may be determined in a manner of remainder operation, thereby limiting the index of PUCCH resources to be not in excess of the preset maximum resource index, that is, $$n_{PUCCH}^{(1)}=(N_{PUCCH}^{(1)}+X \times N_{RB}^{index}+n_{CCE}) \bmod N_{ePDCCH}^{load};$$

assuming that $N_{ePDCCH}^{load}=20$, PUCCH resources of the three pieces of UE are respectively:

$$n_{PUCCH}^{(1)}=(N_{PUCCH}^{(1)}+4+1) \bmod 20 = 3$$

$$n_{PUCCH}^{(1)}=(n_{PUCCH}^{(1)}+20+2) \bmod 20 = 0, \text{ and}$$

$$n_{PUCCH}^{(1)}=(N_{PUCCH}^{(1)}+36+2) \bmod 20 = 16.$$

Hence, the PUCCHs of the three pieces of UE are mapped into different OCC or CS resources in the same PRB, thereby improving the spectral efficiency of the PUCCHs.

In another embodiment, other items may be added, so as to lower a possibility of collision brought by remainder operation. For example, down round-off of $N_{ePDCCH}^{load}$ is added, that is $$n_{PUCCH}^{(1)}=([\ldots] \bmod N_{ePDCCH}^{load}+\lfloor \ldots \rfloor) \bmod N_{ePDCCH}^{load}.$$

Wherein, the function in [ ] may use a formula identical to that of the prior art in calculating $n_{PUCCH}^{(1)}$, such as $N_{PUCCH}^{(1)}+n_{CCE}$ may also use the formulae and methods given in embodiments 1, 3 and 5, such as $N_{PUCCH}^{(1)}{}_{distributed}+n_{CCE}$ for the distributed mapping, and $N_{PUCCH}^{(1)}{}_{localized}+n_{CCE}$ for the localized mapping, and may also use any other formula, such as $N_{PUCCH}^{(1)}+n_{CCE}+n_{AP}$; where, $n_{AP}$ is an index of an antenna port (DM-RS) port to which an E-PDCCH corresponds; or $n_{PUCCH}^{(1)}+n_{CCE}+$ ARI; where, ARI is a parameter configured by a high layer. Hence, a preferred manner may be:

$$n_{PUCCH}^{(1)}=([N_{PUCCH}^{(1)}+n_{CCE}+n_{AP}] \bmod N_{ePDCCH}^{load}+\lfloor [N_{PUCCH}^{(1)}+n_{CCE}+n_{AP}]/N_{ePDCCH}^{load} \rfloor) \bmod N_{ePDCCH}^{load} \quad (a);$$

or $$n_{PUCCH}^{(1)}=([N_{PUCCH}^{(1)}+n_{CCE}+n_{AP}] \bmod N_{ePDCCH}^{load}+\lfloor [N_{PUCCH}^{(1)}+n_{CCE}]/N_{ePDCCH}^{load} \rfloor+n_{AP}) \bmod N_{ePDCCH}^{load} \quad (b).$$

Assuming that there are three pieces of UE, $n_{CCE}$ is 1, 19 and 21, respectively, and the corresponding DM-RS ports are a port 7, a port 9 and a port 7, respectively, then, according to load formula (b), assuming that $N_{PUCCH}^{(1)}=5$, $N_{ePDCCH}^{load}=20$, $n_{PUCCH}^{(1)}$ of the three pieces of UE are respectively:

$$n_{PUCCH}^{(1)}=([N_{PUCCH}^{(1)}+1+0] \bmod 20 + \lfloor [N_{PUCCH}^{(1)}+1]/20 \rfloor + 0) \bmod 20 = 6,$$

$$n_{PUCCH}^{(1)}=([N_{PUCCH}^{(1)}+19+2] \bmod 20 + \lfloor [N_{PUCCH}^{(1)}+19]/20 \rfloor + 2) \bmod 20 = 9,$$

$$n_{PUCCH}^{(1)}=([N_{PUCCH}^{(1)}+21+0] \bmod 20 + \lfloor [N_{PUCCH}^{(1)}+21]/20 \rfloor + 0) \bmod 20 = 7.$$

Hence, all the PUCCHs of the three pieces of UE are all mapped into different OCC or CS resources in the same PRB, thereby improving the spectral efficiency of the PUCCHs.

If the UE1 and the UE3 calculate $n_{PUCCH}^{(1)}$ according only to the first item, i.e. $[\ldots] \bmod N_{ePDCCH}^{load}$, then $n_{PUCCH}^{(1)}$ are all 6, and collision occurs in the PUCCH resources of the UEs. As down round-off of $N_{ePDCCH}^{load}$ is added, values of the second item are different, thereby making the UE to avoid collision. And if the UE2 and the UE3 calculate all according to formula (a), that is, the expressions in the parentheses of the first item and the second item are completely identical, then $n_{PUCCH}^{(1)}$ are all 7, and collision occurs in the PUCCH resources of the UE. As the expressions in the parentheses of the second item and the first item in the formula (b) are different, collision of PUCCH resources between the UEs are avoided.

In this embodiment, a PUCCH calculation formula and a corresponding method for calculating PUCCH resources are not limited. For example, they may be achieved by using the methods in Embodiment 1, Embodiment 3 or Embodiment 5 of the present invention, only if the calculated resource index of the PUCCH resources is not in excess of the preset maximum resource index of PUCCHs, which are all covered by the protection scope of the present invention.

With the method of this embodiment, a maximum resource index of PUCCHs may be preset, so that the calculated resource index of the PUCCH resources is not in excess of the preset value, thereby improving the spectral efficiency of the PUCCHs. When the PUCCH resources are calculated by using the methods in Embodiment 1, Embodiment 3 or Embodiment 5, resource collision between different UEs may be avoided at the same time.

Embodiment 7

Figure 12:
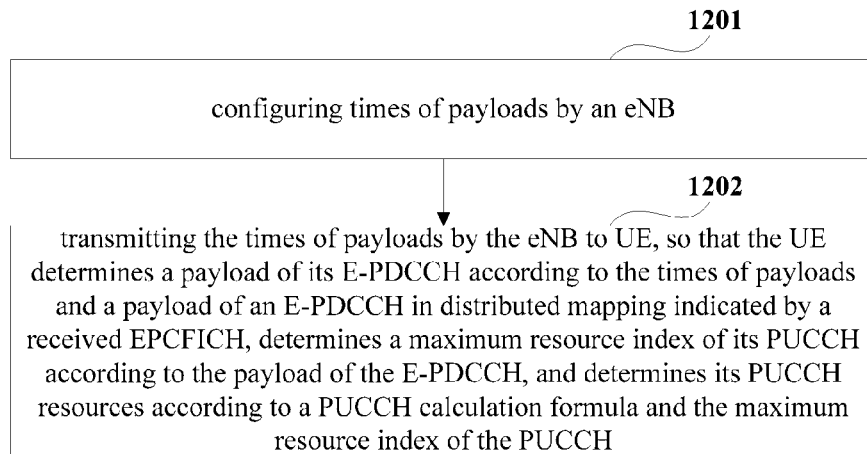
FIG. 12 is flowchart of a method for determining uplink control channel (PUCCH) resources of Embodiment 7.

An embodiment of the present invention further provides a method for determining uplink control channel resources, which is processing at an eNB side to which an implementation mode of Embodiment 6 corresponds. FIG. 12 is a flowchart of the method. Referring to FIG. 12, the method includes:

step 1201: configuring times of payloads by an eNB; and step 1202: transmitting the times of payloads by the eNB to UE, so that the UE determines a payload of its E-PDCCH according to the times of payloads and a payload of an E-PDCCH in distributed mapping indicated by a received EPCFICH, determines a maximum resource index of its PUCCH according to the payload of the E-PDCCH, and determines its PUCCH resources according to a PUCCH calculation formula and the maximum resource index of the PUCCH.

This embodiment corresponds to the implementation mode in Embodiment 6 jointly obtaining the payload of the E-PDCCH according to the EPCFICH and the high-layer signaling.

In this embodiment, if the EPCFICH indicates only the number $N_{ePDCCH}^{distributed}$ eCCEs to which all the E-PD- CCHs of the UE mapped in the distributed manner correspond, the eNB may preconfigure a time of payloads L and transmit the time of payloads to the UE via a high-layer signaling, the UE may determine the payload $N_{ePDCCH}^{load}=L \times N_{ePDCCH}^{distributed}$ of the E-PDCCH according to the time of payloads L and $N_{ePDCCH}^{distributed}$ obtained from the EPCFICH, so as to denote the number of eCCEs of the E-PDCCHs of all the UE. In this way, the UE may determine the payload of the E-PDCCH, determine the maximum resource index of the PUCCH accordingly, and determine its PUCCH resources according to the PUCCH calculation formula, thereby improving the spectral efficiency of the PUCCHs.

In this embodiment, processing at the UE side in this implementation mode has be described, the contents of which being incorporated herein, which shall not be described herein any further.

Embodiment 8

Figure 13:
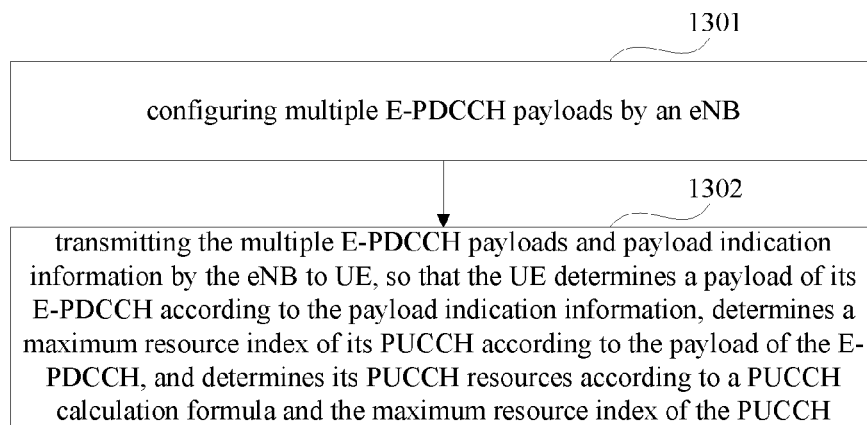
FIG. 13 is flowchart of a method for determining uplink control channel (PUCCH) resources of Embodiment 8.

An embodiment of the present invention further provides a method for determining uplink control channel resources, which is processing at an eNB side to which another implementation mode of Embodiment 6 corresponds. FIG. 13 is a flowchart of the method. Referring to FIG. 13, the method includes:

step 1301: configuring multiple E-PDCCH payloads by an eNB; and step 1302: transmitting the multiple E-PDCCH payloads and payload indication information by the eNB to UE, so that the UE determines a payload of its E-PDCCH according to the payload indication information, determines a maximum resource index of its PUCCH according to the payload of the E-PDCCH, and determines its PUCCH resources according to a PUCCH calculation formula and the maximum resource index of the PUCCH.

In this embodiment, if there exists no EPCFICH, the eNB may configure multiple E-PDCCH payloads $N_{ePDCCH}^{load}$ via a high layer signaling, and which $N_{ePDCCH}^{load}$ being employed is dynamically indicated to the UE by adding a bit or multiplexing an existing bit to a DCI of the E-PDCCH transmitted to the UE. Therefore, the UE may determine a payload of the E-PDCCH, determine the maximum resource index of the PUCCH accordingly, and determine its PUCCH resources according to a PUCCH calculation formula, thereby improving the spectral efficiency of the PUCCH.

In this embodiment, processing at the UE side in this implementation mode has be described, the contents of which being incorporated herein, which shall not be described herein any further.

An embodiment of the present invention further provides UE, as described in Embodiment 9 below. As the principle of the UE for solving problems is similar to that of the method in Embodiment 1, the implementation of the method in Embodiment 1 is referred to for the implementation of the UE, and the repeated parts shall not be described any further.

Embodiment 9

Figure 14:
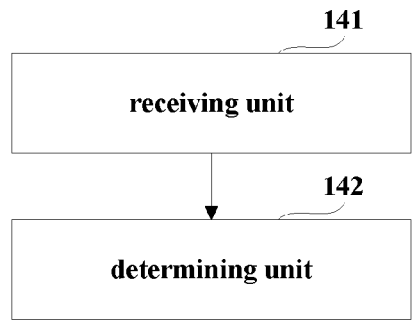
FIG. 14 is a schematic diagram of the structure of user equipment of Embodiment 9.

An embodiment of the present invention further provides user equipment (UE). FIG. 14 is a schematic diagram of the structure of the UE. Referring to FIG. 14, the UE includes:

a receiving unit 141 configured to receive a specific parameter configured for a mapping manner of an enhanced physical downlink control channel (E-PDCCH) of the UE by an eNB; and a determining unit 142 configured to determine uplink control channel (PUCCH) resources of the UE according to the specific parameter corresponding to the mapping manner of the E-PDCCH of the UE and a PUCCH calculation formula.

Wherein, the receiving unit 141 is configured to: receive the specific parameter corresponding to the mapping manner of its E-PDCCH transmitted by the eNB, or receive specific parameters configured for different mapping manners of the E-PDCCH transmitted by the eNB, and determine its specific parameter according to the mapping manner of its E-PDCCH.

With the UE of this embodiment, the eNB configures different mapping manners of E-PDCCH with different specific parameters, and the PUCCH resources obtained through calculation by the UE in the different mapping manners of E-PDCCH according to the different specific parameters are different, thereby avoiding the problem of collision of PUCCH resources.

An embodiment of the present invention further provides an eNB, as described in Embodiment 10 below. As the principle of the eNB for solving problems is similar to that of the method in Embodiment 2, the implementation of the method in Embodiment 2 is referred to for the implementation of the eNB, and the repeated parts shall not be described any further.

Embodiment 10

Figure 15:
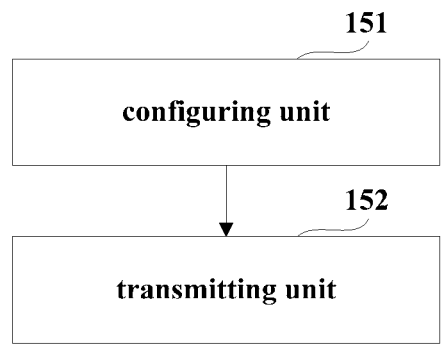
FIG. 15 is a schematic diagram of the structure of an eNB of Embodiment 10.

An embodiment of the present invention further provides an eNB. FIG. 15 is a schematic diagram of the structure of the eNB. Referring to FIG. 15, the eNB includes:

a configuring unit 151 configured to configure different specific parameters for different mapping manners of E-PDCCH of UE; and a transmitting unit 152 configured to transmit the different specific parameters to the UE, or transmit a specific parameter corresponding to the mapping manner of the E-PDCCH of the UE to the UE, so that the UE determines its uplink control channel (PUCCH) resources according to the specific parameter corresponding to the mapping manner of its E-PDCCH and a PUCCH calculation formula.

With the eNB of this embodiment, different mapping manners of E-PDCCH are configured with different specific parameters, and the PUCCH resources obtained through calculation by the UE in the different mapping manners of E-PDCCH according to the different specific parameters are different, thereby avoiding the problem of collision of PUCCH resources.

An embodiment of the present invention further provides UE, as described in Embodiment 11 below. As the principle of the UE for solving problems is similar to that of the method in Embodiment 3, the implementation of the method in Embodiment 3 is referred to for the implementation of the UE, and the repeated parts shall not be described any further.

Embodiment 11

Figure 16:
FIG. 16 is a schematic diagram of the structure of user equipment of Embodiment 11.

An embodiment of the present invention further provides user equipment (UE). FIG. 16 is a schematic diagram of the structure of the UE. Referring to FIG. 16, the UE includes:

a determining unit 161 configured to determine PUCCH resources of the UE according to a specific parameter configured by an eNB and a PUCCH calculation formula corresponding to a mapping manner of E-PDCCH of the UE.

In an embodiment, when the mapping manner of the E-PDCCH of the UE is localized mapping, the determining unit 161 determines the PUCCH resources of the UE according to the following formula configured by the eNB for the UE:

$$n_{PUCCH}^{(1)}=N_{PUCCH}^{(1)}+Z \times N_{RB}^{index}+Y \times n_{CCE};$$

where, $N_{PUCCH}^{(1)}$ is a specific parameter semi-statically configured by a high layer, $N_{RB}^{index}$ is an index of a physical resource block (PRB) occupied by the E-PDCCH, Z is a maximum number of pieces of downlink control information (DCI) carried in each PRB in distributed mapping, Y is a ratio of the maximum number of pieces of DCI carried in each PRB in distributed mapping and a maximum number of pieces of DCI carried in each PRB in localized mapping, and $n_{CCE}$ is an index of a control channel element (eCCE) in each PRB.

Wherein $n_{CCE}=0, 1, \ldots X-1$, and $n_{CCE}$ is a lowest eCCE index corresponding to the E-PDCCH, or an eCCE index corresponding to the E-PDCCH and associated with a demodulation reference symbol (DM-RS) port.

In another embodiment, when the mapping manner of the E-PDCCH of the UE is distributed mapping, the determining unit 161 determines the PUCCH resources of the UE according to the following formula configured by the eNB for the UE:

$$n_{PUCCH}^{(1)} = n_{PUCCH}^{(1)} + Z \times N_{RB}^{index} + n_{CCE};$$

where, $N_{PUCCH}^{(1)}$ is a specific parameter semi-statically configured by a high layer, $N_{RB}^{index}$ is an index of a PRB occupied by the E-PDCCH, Z is a maximum number of pieces of DCI carried in each PRB in distributed mapping, and $n_{CCE}$ is an index of a resource element group (eREG) or an eCCE or DCI in each PRB.

Wherein $n_{CCE}=0, 1, \ldots Z-1$, and $n_{CCE}$ is a lowest eCCE index corresponding to the E-PDCCH, or an eCCE index corresponding to the E-PDCCH and associated with a DM-RS port.

With the UE of this embodiment, the eNB configures different mapping manners of E-PDCCH with different PUCCH calculation formulae, and the PUCCH resources obtained through calculation by the UE in the different mapping manners of E-PDCCH according to the different PUCCH calculation formulae are different, thereby avoiding the problem of collision of PUCCH resources.

An embodiment of the present invention further provides an eNB, as described in Embodiment 12 below. As the principle of the eNB for solving problems is similar to that of the method in Embodiment 4, the implementation of the method in Embodiment 4 is referred to for the implementation of the eNB, and the repeated parts shall not be described any further.

Embodiment 12

Figure 17:
FIG. 17 is a schematic diagram of the structure of an eNB of Embodiment 12.

An embodiment of the present invention further provides an eNB. FIG. 17 is a schematic diagram of the structure of the eNB. Referring to FIG. 17, the eNB includes:

a configuring unit 171 configured to configure different PUCCH calculation formulae for different mapping manners of E-PDCCH of UE, so that the UE determines its PUCCH resources according to a specific parameter configured by the eNB and a PUCCH calculation formula corresponding to its mapping manner of E-PDCCH.

With the eNB of this embodiment, different mapping manners of E-PDCCH are configured with different PUCCH calculation formulae, and the PUCCH resources obtained through calculation by the UE in the different mapping manners of E-PDCCH according to the different PUCCH calculation formulae are different, thereby avoiding the problem of collision of PUCCH resources.

An embodiment of the present invention further provides UE, as described in Embodiment 13 below. As the principle of the UE for solving problems is similar to that of the method in Embodiment 5, the implementation of the method in Embodiment 5 is referred to for the implementation of the UE, and the repeated parts shall not be described any further.

Embodiment 13

Figure 18:
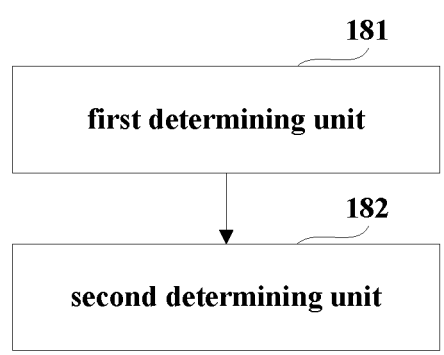
FIG. 18 is a schematic diagram of the structure of user equipment of Embodiment 13.

An embodiment of the present invention further provides user equipment (UE). FIG. 18 is a schematic diagram of the structure of the UE. Referring to FIG. 18, the UE includes:

a first determining unit 181 configured to determine a starting point of PUCCH resources of the UE according to a payload of an E-PDCCH and a mapping manner of E-PDCCH of the UE; and a second determining unit 182 configured to determine PUCCH resources of the UE according to the starting point of the PUCCH resources of the UE and a PUCCH calculation formula.

Wherein, the payload of the E-PDCCH is determined via the number of eCCEs or the number of PRBs indicated by a physical control format indicator channel (EPCFICH).

Wherein, the starting point of a PUCCH in a mapping manner of E-PDCCH is in close proximity to a possible maximum resource index of a PUCCH in another mapping manner of E-PDCCH.

With the UE of this embodiment, the eNB configures different mapping manners of E-PDCCH with different starting points of PUCCH resources, and the PUCCH resources obtained through calculation by the UE in the different mapping manners of E-PDCCH according to the different starting points of PUCCH resources are different, thereby avoiding the problem of collision of PUCCH resources.

An embodiment of the present invention further provides UE, as described in Embodiment 14 below. As the principle of the UE for solving problems is similar to that of the method in Embodiment 6, the implementation of the method in Embodiment 6 is referred to for the implementation of the UE, and the repeated parts shall not be described any further.

Embodiment 14

Figure 19:
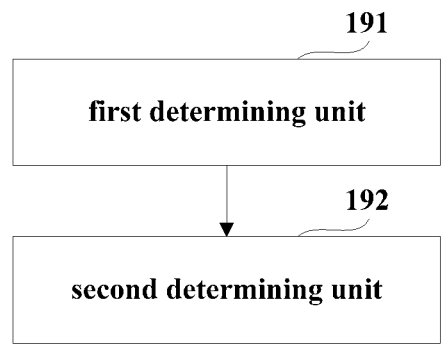
FIG. 19 is a schematic diagram of the structure of user equipment of Embodiment 14.

An embodiment of the present invention further provides user equipment (UE). FIG. 19 is a schematic diagram of the structure of the UE. Referring to FIG. 19, the UE includes:

a first determining unit 191 configured to determine a maximum resource index of a PUCCH, dynamically according to a payload of an E-PDCCH, or dynamically according to a maximum value preconfigured by a high-layer; and a second determining unit 192 configured to determine PUCCH resources of the UE, according to a PUCCH calculation formula and the maximum resource index of the PUCCH.

Wherein, in determining a maximum resource index of a PUCCH dynamically according to a payload of an E-PDCCH, the first determining unit 191 obtains directly or indirectly the payload of the E-PDCCH via a EPCFICH, or obtains through calculation the payload of the E-PDCCH via an EPCFICH and high-layer signaling; and then determines the maximum resource index of the PUCCH according to the payload of the E-PDCCH.

Wherein, in determining a maximum resource index of a PUCCH dynamically according to a maximum value preconfigured by a high-layer, the first determining unit 191 first receives multiple E-PDCCH payloads preconfigured by an eNB and transmitted by the eNB, determines its E-PDCCH payload according to payload indication information transmitted by the eNB, and then determines the maximum resource index of the PUCCH according to the E-PDCCH payload.

Wherein, the second determining unit 192 determines PUCCH resources of the UE by performing a modular operation on the maximum resource index of the PUCCH by using the value obtained through calculation according to the PUCCH calculation formula.

With the UE of this embodiment, the eNB presets the maximum resource index of the PUCCH, and after the UE calculates the PUCCH resources by using the PUCCH calculation formulae, the spectral efficiency of the PUCCH is improved by limiting the resource index of the calculated resource to be within the preset maximum resource index of the PUCCH. And collision of PUCCH resources is avoided in calculating the PUCCH resources by using the methods of Embodiment 9, Embodiment 11, or Embodiment 13.

An embodiment of the present invention further provides an eNB, as described in Embodiment 15 below. As the principle of the eNB for solving problems is similar to that of the method in Embodiment 7, the implementation of the method in Embodiment 7 is referred to for the implementation of the eNB, and the repeated parts shall not be described any further.

Embodiment 15

Figure 20:
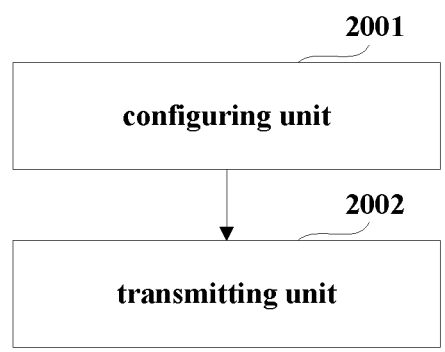
FIG. 20 is a schematic diagram of the structure of an eNB of Embodiment 15.

An embodiment of the present invention further provides an eNB. FIG. 20 is a schematic diagram of the structure of the eNB. Referring to FIG. 20, the eNB includes:

a configuring unit 2001 configured to configure times of payloads; and a transmitting unit 2002 configured to transmit the times of payloads to UE, so that the UE determines a payload of an E-PDCCH according to the times of payloads and the payload of an E-PDCCH in distributed mapping indicated by a received EPCFICH, determines a maximum resource index of its PUCCH according to the payload of the E-PDCCH, and determines its PUCCH resources according to a PUCCH calculation formula and the maximum resource index of the PUCCH.

By configuring corresponding parameters by the eNB of this embodiment, the UE may determine a payload of E-PDCCH, and determine its PUCCH resources accordingly, thereby improving the spectral efficiency of the PUCCH resources.

An embodiment of the present invention further provides an eNB, as described in Embodiment 16 below. As the principle of the eNB for solving problems is similar to that of the method in Embodiment 8, the implementation of the method in Embodiment 8 is referred to for the implementation of the eNB, and the repeated parts shall not be described any further.

Embodiment 16

Figure 21:
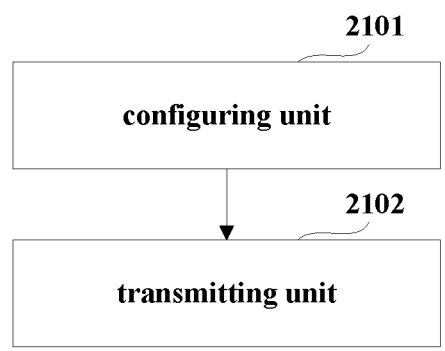
FIG. 21 is a schematic diagram of the structure of an eNB of Embodiment 16.

An embodiment of the present invention further provides an eNB. FIG. 21 is a schematic diagram of the structure of the eNB. Referring to FIG. 21, the eNB includes:

a configuring unit 2101 configured to configure multiple E-PDCCH payloads; and a transmitting unit 2102 configured to transmit the multiple E-PDCCH payloads and payload indication information to UE, so that the UE determines a payload of its E-PDCCH according to the payload indication information, determines a maximum resource index of its PUCCH according to the payload of the E-PDCCH, and determines its PUCCH resources according to a PUCCH calculation formula and the maximum resource index of the PUCCH.

By configuring corresponding parameters by the eNB of this embodiment, the UE may determine a payload of E-PDCCH, and determine its PUCCH resources accordingly, thereby improving the spectral efficiency of the PUCCH resources.

An embodiment of the present invention further provides a computer-readable program, wherein when the program is executed in user equipment, the program enables a computer to carry out the method for determining uplink control channel resources as described in Embodiment 1, Embodiment 3, Embodiment 5, or Embodiment 6, in the user equipment.

An embodiment of the present invention further provides a storage medium in which a computer-readable program is stored, wherein the computer-readable program enables a computer to carry out the method for determining uplink control channel resources as described in Embodiment 1, Embodiment 3, Embodiment 5, or Embodiment 6, in user equipment.

An embodiment of the present invention further provides a computer-readable program, wherein when the program is executed in an eNB, the program enables a computer to carry out the method for determining uplink control channel resources as described in Embodiment 2, Embodiment 4, Embodiment 7, or Embodiment 8, in the eNB.

An embodiment of the present invention further provides a storage medium in which a computer-readable program is stored, wherein the computer-readable program enables a computer to carry out the method for determining uplink control channel resources as described in Embodiment 2, Embodiment 4, Embodiment 7, or Embodiment 8, in an eNB.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. User equipment (UE), comprising:
   a receiver configured to receive a specific parameter configured for a mapping manner of an enhanced physical downlink control channel (E-PDCCH) of the UE by an eNB, wherein the specific parameter configured for the mapping manner of the E-PDCCH corresponds to a localized mapping or a distributed mapping; and
   a processing circuit configured to determine physical uplink control channel (PUCCH) resources of the UE according to the specific parameter corresponding to the localized or distributed mapping of the E-PDCCH of the UE and a PUCCH calculation formula.

2. The UE according to claim 1, wherein the receiver is configured to:
   receive the specific parameter corresponding to the mapping manner of its E-PDCCH transmitted by the eNB;
   or receive specific parameters configured for different mapping manners of the E-PDCCH transmitted by the eNB, and determine each specific parameter according to the mapping manner of its E-PDCCH.

3. An eNB, comprising:
   a processing circuit configured to configure different specific parameters for different mapping manners of an enhanced physical downlink control channel (E-PDCCH) of user equipment (UE), wherein the different specific parameter configured for the different mapping manners of the E-PDCCH correspond to a localized mapping or a distributed mapping; and a transmitter configured to transmit the different specific parameters to the UE, or transmit a specific parameter corresponding to the mapping manner of the E-PDCCH of the UE to the UE, so that the UE determines its physical uplink control channel (PUCCH) resources according to the specific parameter corresponding to the localized or distributed mapping of its E-PDCCH and an uplink control channel (PUCCH) calculation formula.

4. User equipment (UE), comprising:

a processing circuit configured to determine physical uplink control channel (PUCCH) resources of the UE according to a specific parameter configured by an eNB and a PUCCH calculation formula corresponding to a localized or distributed mapping of an enhanced physical downlink control channel (E-PDCCH) of the UE; and a receiver configured to receive signals from the eNB.

5. The UE of claim 4, wherein the PUCCH calculation formula is different depending on whether the mapping manner is the localized or the distributed mapping manner.

6. The UE according to claim 4, wherein when the mapping of the E-PDCCH of the UE is the localized mapping, the processing circuit determines the PUCCH resources of the UE according to the following formula configured by the eNB for the UE:

$$n_{PUCCH}^{(1)} = N_{PUCCH}^{(1)} + Z \times N_{RB}^{index} + Y \times n_{CCE};$$

where, $N_{PUCCH}^{(1)}$ is a specific parameter semi-statically configured by a high layer, $N_{RB}^{index}$ is an index of a physical resource block (PRB) occupied by the E-PDCCH, Z is a maximum number of pieces of downlink control information (DCI) carried in each PRB in the distributed mapping, Y is a ratio of the maximum number of pieces of DCI carried in each PRB in the distributed mapping and a maximum number of pieces of DCI carried in each PRB in the localized mapping, and $n_{CCE}$ is an index of a control channel element (eCCE) in each PRB.

7. The UE according to claim 6, wherein $n_{CCE}=0,1,\ldots X-1$, and $n_{CCE}$ is a lowest eCCE index corresponding to the E-PDCCH, or an eCCE index corresponding to the E-PDCCH and associated with a demodulation reference symbol (DM-RS) port.

8. The UE according to claim 6, wherein when the mapping of the E-PDCCH of the UE is the distributed mapping, the processing circuit determines the PUCCH resources of the UE according to the following formula configured by the eNB for the UE:

$$n_{PUCCH}^{(1)} = N_{PUCCH}^{(1)} + Z \times N_{RB}^{index} + n_{CCE};$$

where, $N_{PUCCH}^{(1)}$ is a specific parameter semi-statically configured by a high layer, $N_{RB}^{index}$ is an index of a PRB occupied by the E-PDCCH, Z is a maximum number of pieces of DCI carried in each PRB in the distributed mapping, and $n_{CCE}$ is an index of a resource element group (eREG) or an eCCE or DCI in each PRB.

9. The UE according to claim 8, wherein $n_{CCE}=0, 1, \ldots Z-1$, and $n_{CCE}$ is a lowest eCCE index corresponding to the E-PDCCH, or an eCCE index corresponding to the E-PDCCH and associated with a DM-RS port.

10. An eNB, comprising:

a processing circuit configured to configure different physical uplink control channel (PUCCH) calculation formulae for localized or distributed mapping of an enhanced physical downlink control channel (E-PDCCH) of a user equipment (UE), so that the UE determines its PUCCH resources according to a specific parameter configured by the eNB and a PUCCH calculation formula corresponding to the localized or distributed mapping of the E-PDCCH; and a receiver configured to receive signals from the UE.

11. The eNB of claim 10, wherein the same and the PUCCH calculation formula is different depending on whether the mapping manner is the localized or the distributed mapping manner.

* * * * *